United States Patent [19]
Gafken

[11] Patent Number: 5,778,412
[45] Date of Patent: Jul. 7, 1998

[54] METHOD AND APPARATUS FOR INTERFACING A DATA BUS TO A PLURALITY OF MEMORY DEVICES

[75] Inventor: Andrew H. Gafken, Folsom, Calif.

[73] Assignee: Intel Corporation, Santa Clara, Calif.

[21] Appl. No.: 536,378

[22] Filed: Sep. 29, 1995

[51] Int. Cl.[6] .................................................. G06F 12/04
[52] U.S. Cl. .................................................. 711/5; 711/157
[58] Field of Search .......................... 395/405, 484, 395/412, 497.02; 711/5, 202, 157, 127, 171, 172

[56] References Cited

U.S. PATENT DOCUMENTS

| | | |
|---|---|---|
| 4,485,457 | 11/1984 | Balaska et al. ................... 463/45 |
| 4,949,293 | 8/1990 | Kawamura et al. ............... 370/445 |
| 5,247,645 | 9/1993 | Mirza et al. ...................... 711/5 |
| 5,293,607 | 3/1994 | Brockmann et al. .............. 711/5 |
| 5,613,094 | 3/1997 | Khan et al. ....................... 395/500 |

Primary Examiner—Jack A. Lane
Attorney, Agent, or Firm—Blakely, Sokoloff, Taylor & Zafman

[57] ABSTRACT

A method and apparatus for interfacing a data bus to a plurality of memory devices. A portion of data associated with a first address is loaded into a first cell in a first memory device. Another portion of data associated with the first address is loaded into a second cell in a second memory device. Subsequently, a portion of data associated with a second address is loaded into a third cell in the first memory device while another portion of data associated with the second address is loaded into a fourth cell in a third memory device.

33 Claims, 4 Drawing Sheets

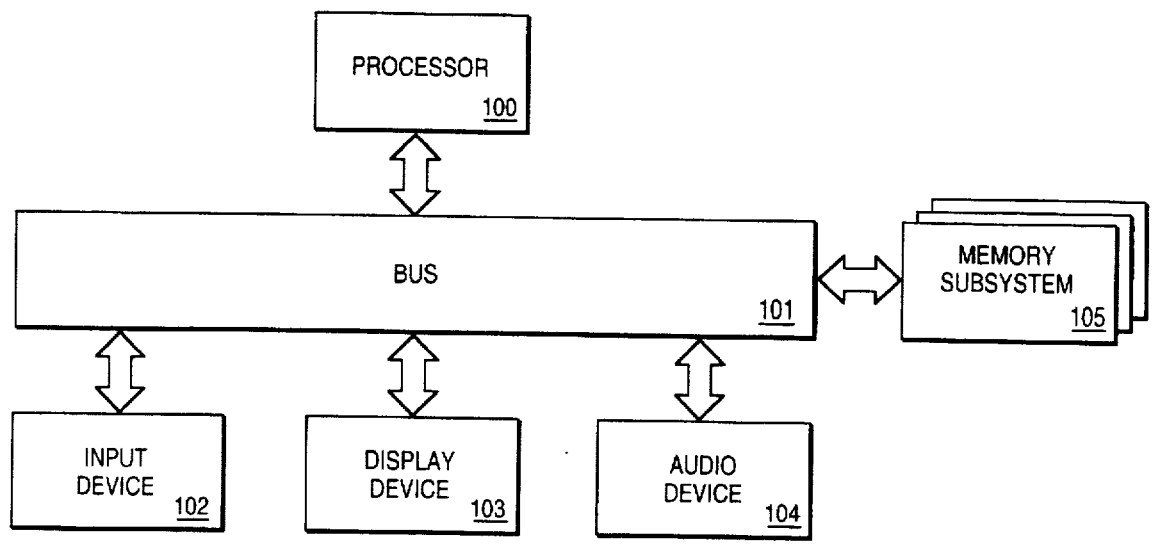
FIG_1 (PRIOR ART)
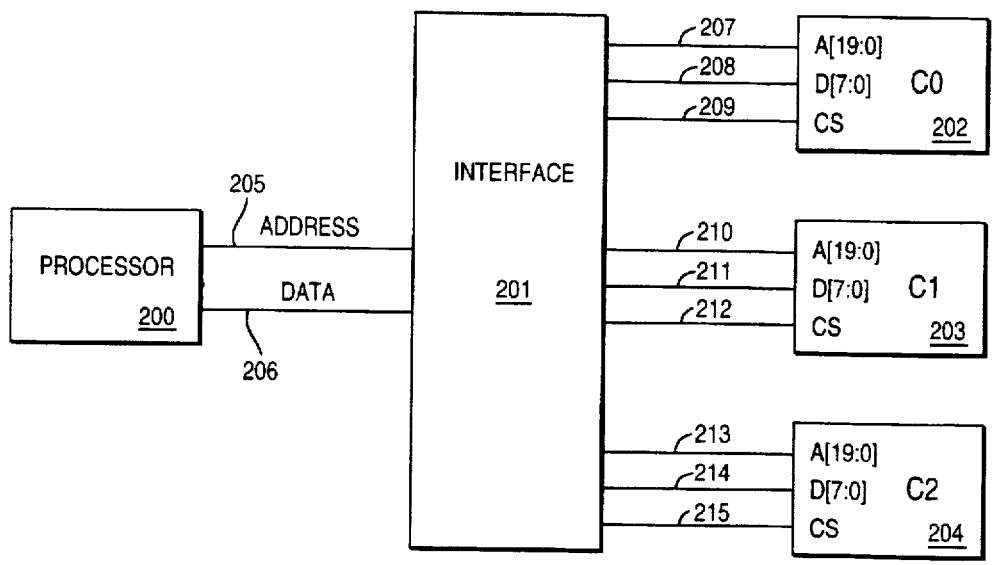
FIG_2

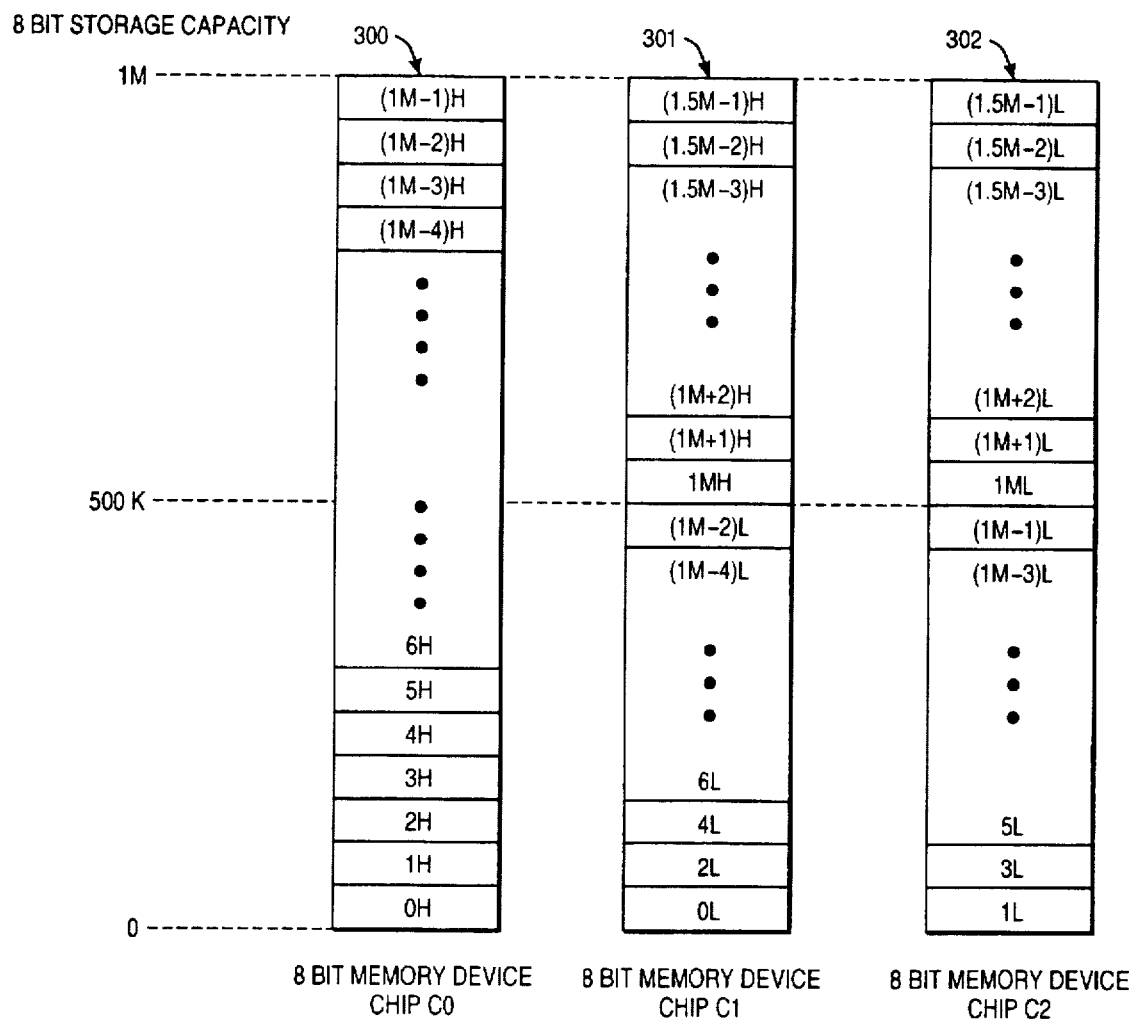
FIG_3

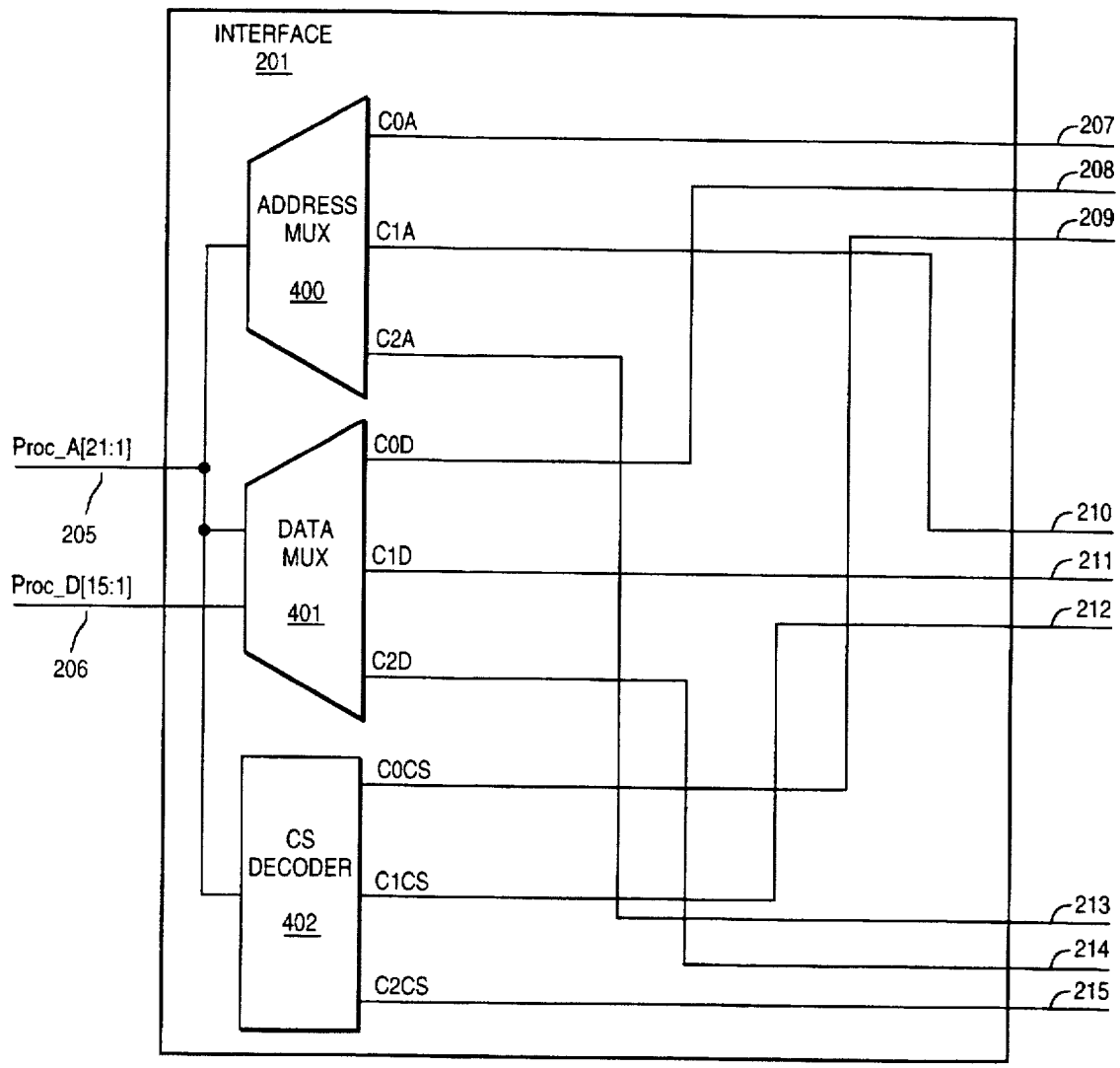
FIG_4

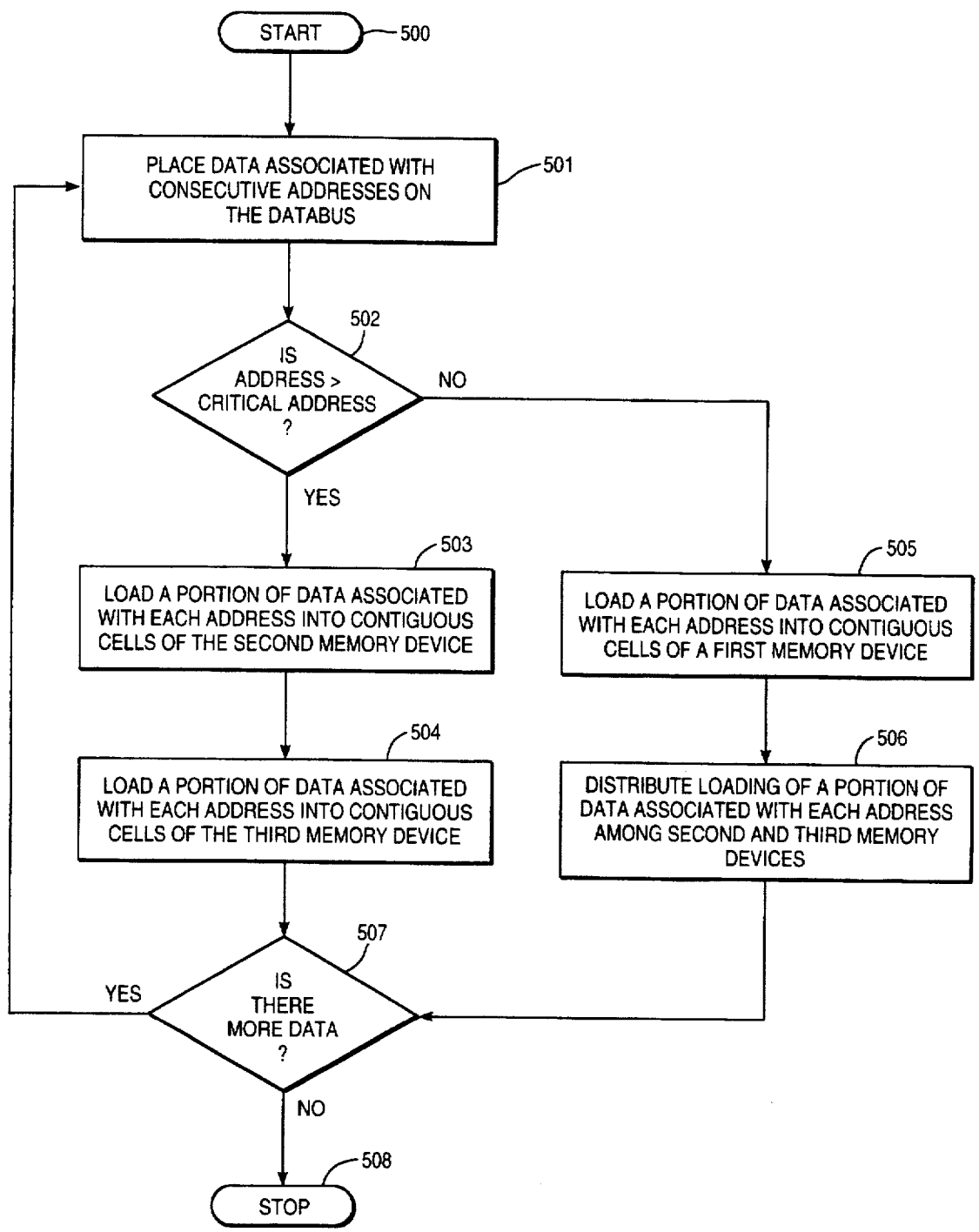
FIG_5

METHOD AND APPARATUS FOR INTERFACING A DATA BUS TO A PLURALITY OF MEMORY DEVICES

FIELD OF THE INVENTION

The present invention relates to computer system bus architectures and more particularly to a host bus to memory subsystem interface.

BACKGROUND OF THE INVENTION

A microprocessor is an electronic device which is capable of performing mathematical computations and other manipulations of information according to given instructions. For this reason, a microprocessor inside a computer is commonly considered the "brain" of the computer system. The microprocessor communicates with and controls the flow of information to and from other parts of the computer system through an interlink known as a bus. A typical computer system may comprise different types of buses and bus interfaces through which a microprocessor, or other type of processor, communicates with various regions of the computer system.

A host bus is the main bus to which a processor is directly coupled. Through the host bus, the processor can communicate with, for example, the computer's main memory, enabling the processor to store and retrieve data. A basic computer system comprises a processor, a memory subsystem and the necessary buses and interfaces to link the two. FIG. 1 shows such a system.

As shown in FIG. 1, processor 100 is coupled to bus 101 which is in turn coupled to memory subsystem 105. Bus 101 contains the necessary interface circuitry which allows information used by processor 100 to be stored and retrieved in memory subsystem 105.

Additional external devices may be coupled to bus 101. For example, an input device 102 may be coupled to bus 101. Input device 102 may be, for example, a computer keyboard or other alphanumeric input device which can be used for communicating information and command selections to processor 100. In addition, other types of input devices, such as a mouse or trackball, may be coupled to bus 101 for communicating direction information and command selections to processor 100 and for controlling cursor movement on display device 103. Display device 103 is coupled to processor 100 via bus 101 and is used to display information to a computer user. Display device 103 may comprise, for example, a computer screen, such as a cathode ray tube (CRT) or a flat panel display. Another device which may be coupled to bus 101 is a device for sound recording or playback, as represented by audio device 104. For example, audio device 104 may comprise a microphone to support voice recognition applications and may include speakers for playback of multimedia applications.

A significant limitation of the basic computer system comprising processor 100, bus 101 and memory subsystem 105 of FIG. 1 is that the memory data bus which carries data to and from memory subsystem 105 must be "matched" to the processor data bus which carries data to and from processor 100. This means that the total data bit width of the memory data bus coupled to memory subsystem 105 must be equal to or some multiple of the data bit width of the processor data bus coupled to processor 100. For example, in a typical configuration the data bus portion of the host bus coupled to processor 100 is 16 bits wide. In such a system, the total data bit width of memory subsystem 105, must also be 16 bits wide or some multiple of 16 bits such as, for example, 32 bits or 64 bits.

When the data bit width of memory subsystem 105 is matched to the bit width of the data bus coupled to processor 100, data can be stored and retrieved to and from memory subsystem 105 in a very straightforward manner. For example, if the bit width of the data bus coupled to processor 100 is 16 bits wide, a 16 bit wide data element, or word, associated with an address can be easily transferred to a 16 bit wide data bus coupled to memory subsystem 105. This may be accomplished by, for example, hardwiring the 16 bit wide processor data bus to the 16 bit wide memory data bus. If the data bus coupled to memory subsystem 105 is 32 bits wide, the bus may be simply divided into two sets of 16 bit wide buses so that each data word may be sent through one or the other 16 bit wide buses depending on the address value associated with each word.

Unfortunately, this processor to memory subsystem coupling scheme cannot accommodate a situation in which the total data bit width of the memory subsystem does not match the bit width of the data bus coupled to the processor. For example, if the total data bit width of memory subsystem 105 is 24 bits, while the data bus coupled to processor 100 is 16 bits, each word of data from processor 100 may be mapped to the first 16 bits of the data bus coupled to memory subsystem 105 however, the remaining 8 bits of the memory data bus are not wide enough to accept an entire word of data. In such a scheme, the memory capacity associated with those additional 8 bits of the memory subsystem data bus will be wasted because they cannot accept the word data sent by processor 100. As a result of this limitation, only certain, discrete memory capacities can be incorporated into prior art computer systems.

SUMMARY OF THE INVENTION

It is an object of the present invention to provide a method for interfacing a memory subsystem data bus to an unmatched processor data bus.

A method and apparatus is described for interfacing a data bus to a plurality of memory devices. A portion of data associated with a first address is loaded into a first cell in a first memory device. Another portion of data associated with the first address is loaded into a second cell in a second memory device. Subsequently, a portion of data associated with a second address is loaded into a third cell in the first memory device while another portion of data associated with the second address is loaded into a fourth cell in a third memory device.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which:

FIG. 1 is a block diagram of a computer system including peripheral devices.

FIG. 2 is a block diagram of a computer system including an interface for coupling a processor to a plurality of memory devices.

FIG. 3 shows the memory cells of a plurality of memory devices.

FIG. 4 is a more detailed schematic of the interface of FIG. 2.

FIG. 5 shows a flow chart in accordance with an embodiment of the present invention.

DETAILED DESCRIPTION

A method and apparatus is described for interfacing a data bus to a memory subsystem comprising a plurality of memory devices wherein the total data bit width of the memory subsystem does not match the bit width of the processor data bus. In accordance with one embodiment of the present invention, during a first mode of operation a first portion of data associated with a first address is loaded into a first cell in a first memory device. A second portion of the data associated with the first address is loaded into a second cell in a second memory device. Subsequently, an equivalent first portion of data associated with a second, consecutive address is loaded into a third cell in the first memory device while an equivalent second portion of data associated with the second address is loaded into a fourth cell in a third memory device. Thereafter, an equivalent first portion of data associated with a third, consecutive address is loaded into a fifth cell in the first memory device while an equivalent second portion of data associated with the third address is loaded into a sixth cell in the second memory device.

Note that for purposes of this discussion, numeric labeling of cells within memory devices, as used above, unless otherwise indicated, are not meant to directly correspond to address locations within those memory devices. Rather, cells are numbered to differentiate one from the next, not necessarily to indicate consecutivity. For example, for the embodiment described above, the third cell is contiguous with the first cell and fifth cell in the first memory device, but not with the second cell. The second cell is contiguous with the sixth cell in the second memory device.

During a second mode of operation, data associated with consecutive addresses above a critical address is loaded into contiguous cells of the second and third memory devices. The critical address corresponds to the largest address which can be accommodated by the first memory device. A method and apparatus for interfacing a data bus to a memory subsystem comprising a plurality of memory devices will be described in more detail below.

FIG. 2 shows a computer system including a processor 200 coupled to interface 201 through processor address bus 205 and processor data bus 206. Interface 201 is coupled to memory devices 202, 203 and 204 by an address bus comprising address lines 207, 210 and 213; a data bus comprising data lines 208, 211 and 214; and chip select lines 209, 212 and 215. Memory devices 202, 203 and 204 comprise a memory subsystem containing three memory chips C0, C1 and C2. For one embodiment of the present invention each of memory devices 202, 203 and 204 comprises a flash memory chip having a storage capacity of 1 MB and being 8 bits wide. Therefore, in this embodiment, the total storage capacity of the memory subsystem comprising memory devices 202, 203 and 204 is 3 MB.

The advantage of the system shown in FIG. 2, described in greater detail below, is that it can be employed in situations in which 4 MB of memory is more than is necessary for a particular application, while 2 MB of memory is not enough. Because flash memory chips contribute to the cost and size of the overall computer system, it is desirable to limit the capacity of memory storage to only what is required in a particular system in order to reduce costs and improve portability.

Unfortunately, the total data bit width of the 3 MB memory subsystem shown in FIG. 2 does not match the bit width of processor data bus 206. In particular, the total data bit width of the memory subsystem comprising memory devices 202, 203 and 204 is equal to the sum of data bit widths of each device. That is, because each of the three devices comprises a data bit width equal to a byte, the total data bit width of the 3 MB memory subsystem shown is 24 bits. Clearly, a total data bit width of 24 bits for a memory subsystem is not equal to nor is it a multiple of the 16 bit wide processor data bus 206. Therefore, interface 201 must be capable of mapping data arriving over processor data bus 206 to the memory subsystem data bus comprising data lines 208, 211 and 214 in a manner such that the full 3 MB of memory capacity is utilized.

Alternatively, an interfacing method in accordance with one embodiment of the present invention may be used to couple any of a plurality of processing devices to any of a plurality of memory devices wherein the total data bit width of the memory subsystem comprising the memory devices divided by the bit width of the processor data bus is a non-integer. For example, a microcontroller or other type of bus mastering device may be coupled to a memory subsystem having an unmatched total data bit width using an interfacing scheme in accordance with one embodiment of the present invention. All of the various types of processing devices are herein referred to simply as processors.

In addition, the memory subsystem to which a processor is coupled in accordance with one embodiment of the present invention may comprise storage devices other than flash. For example, for one embodiment a memory subsystem comprises more conventional random access memory (RAM) devices such as dynamic RAM (DRAM) chips. For another embodiment a memory subsystem may comprise programmable read only memory (PROM) devices such as erasable PROM (EPROM) or electrically erasable PROM (EEPROM) chips. One advantage to using memory devices such as flash, EPROM or EEPROM chips is that the data stored in such devices is nonvolatile and so data is retained even when power to the computer system is interrupted. However, because such nonvolatile memory storage devices tend to be relatively expensive, particularly in embedded systems, an interface technique in accordance with one embodiment of the present invention can be implemented to use the full storage capacity of only as many memory devices as are required by a particular application, thereby minimizing costs.

Interface 201 of FIG. 2 is used to couple processor address bus 205 to the memory subsystem address bus comprising address lines 207, 210 and 213, and to couple processor data bus 206 to the memory subsystem data bus comprising data lines 208, 211 and 214. For an alternate embodiment, an interface formed in accordance with one embodiment of the present invention may be used to map address and data information which is multiplexed on the same set of bus lines to a memory subsystem. Also, for an alternate embodiment of the present invention, the bit width of the processor data bus coupled to the interface may be any number of bits wide, while the memory subsystem coupled to the interface may comprise any number of memory devices having a total data bit width of any number of bits wide. As stated above, an interface formed in accordance with one embodiment of the present invention can be employed in a situation in which the total data bit width of the memory subsystem divided by the processor data bus bit width is equal to a non-integer. In other words, the total data bit width of the memory subsystem resides between some multiple of the processor data bus bit width. For example, an interface formed in accordance with one embodiment of the present invention may be used to couple a 16 bit wide processor data bus to a memory subsystem comprising 3, 5, 7 or other odd number of 8 bit wide memory devices. For another embodiment, a 32 bit wide processor data bus may be coupled to a memory subsystem comprising 3, 5, 7 or other odd number of 16 bit wide memory devices or to a memory subsystem comprising 5, 6, 7, 9, 10, 11, 13, 14, 15, etc. eight bit wide memory devices.

In addition to the address and data paths shown in FIG. 2, a typical computer system additionally includes control lines for coupling various components together for controlling the exchange of information between components. These additional control lines and their associated couplings have not been shown in FIG. 2 in order to avoid unnecessarily obscuring the present invention.

FIG. 3 demonstrates a memory loading scheme in accordance with one embodiment of the present invention wherein memory blocks 300, 301 and 302 represent the memory capacities associated with 8 bit memory devices 202, 203 and 204, respectively, as shown in FIG. 2. Because processor data bus 206 carries 16 bit wide word data while each of flash memory chips C0, C1 and C2 store 8 bit wide byte data, interface 201 splits word data on processor data bus 206 into byte data capable of being stored by the flash memory chips. Each word contains two bytes, a high byte, denoted "H" in FIG. 3, and a low byte, denoted "L" in FIG. 3.

In accordance with a first mode of operation, interface 201 splits a word received on processor data bus 206 into two bytes and loads one byte into chip C0 and the other byte into either chip C1 or C2 depending on the address associated with the word. For example, as shown in FIG. 3, the data word associated with address location 0, by processor 200 is split into high and low bytes, 0H and 0L, respectively. Data byte 0H is loaded into cell 0 of chip C0 while 0L is loaded into cell 0 of chip C1. While in a first mode of operation, when interface 201 receives the data word associated with address 1 on processor data bus 206, interface 201 splits the data word into high and low data bytes, 1H and 1L, respectively. High data byte 1H is loaded into chip C0 at the cell location corresponding to address 1. However, in this case the low data byte, 1L, is loaded into the first memory cell of chip C2.

Next, the data word associated with address 2, denoted as data word 2, is split into high and low data bytes, the high byte, 2H, being again loaded into chip C0 while the low byte, 2L, is loaded into the next available cell in chip C1. When the data word associated with address 3, denoted as data word 3, arrives at interface 201 from processor data bus 206 it is similarly split into high and low data bytes. High data byte 3H is loaded into chip C0 while low data byte 3L is loaded into chip C2, as shown in FIG. 3. Continuing in this manner, it can be seen that in accordance with this first mode of operation, data word 4 is split and byte 4H is be loaded into chip C0 and byte 4L is loaded into chip C1. Data word 5 is split and data byte 5H is loaded into chip C0 and data byte 5L is be loaded into chip C2. Data word 6 is split into a high data byte 6H which is loaded into chip C0 and a low data byte 6L which is loaded into chip C1.

As shown in FIG. 3, the data loading scheme proceeds in accordance with this first mode of operation as long as data associated with addresses within the capacity of chip C0 is being received. As shown, data word (1M−4), which is the word associated with word address 1M−4 or byte addresses 2M−8 and 2M−7, is split into high data byte (1M−4)H, loaded into chip C0, and low data byte (1M−4)L, loaded into chip C1. Data word (1M−3) is split into high data byte (1M−3)H, loaded into chip C0, and low data byte (1M−3)L, loaded into chip C2. Data word (1M−2) is split into high data byte (1M−2)H, loaded into chip C0, and low data byte (1M−2)L, loaded into chip C1. Data word (1M−1) is split into high data byte (1M−1)H, loaded into chip C0, and low data byte (1M−1)L, loaded into chip C2. As can be seen, because the high data byte of each data word is loaded into chip C0 in accordance with this first mode of operation while the associated low data byte of each data word is distributed among chips C1 and C2, the memory capacity of chip C0 is used up more rapidly than the memory capacity of either chip C1 or C2. Word address 1M−1 is the largest address which can be accommodated by chip C0 because this word address corresponds to 2 MB of total memory consumed wherein 1 MB is loaded into chip C0 and the other 1 MB is distributed between chips C1 and C2. Once chip C0 is filled to its 1 MB limit, chips C1 and C2 will only be half filled to 500 KB. Data associated with addresses above this critical address is loaded into chips C1 and C2 in a second mode of operation.

A critical address is the address corresponding to the largest address which can be accommodated by chip C0. Data words associated with addresses above this critical address are loaded into chips C1 and C2 in accordance with a second mode of operation of interface 201 as shown in FIG. 3. For example, data word 1M is split into a high data byte 1MH, loaded into chip C1, and a low data byte 1ML, loaded into chip C2. Data word (1M+1) is split into a high data word (1M+1)H, loaded into chip C1, and a low data word (1M+1)L, loaded into chip C2. Data word (1M+2) is split into a high data byte (1M+2)H, loaded into chip C1, and a low data byte (1M+2)L, loaded into chip C2. In accordance with an embodiment of the present invention, the first and second modes of loading data into chips C0, C1 and C2 enables the full 3 MB of the memory subsystem comprising chips C0, C1 and C2 to be utilized. As shown in FIG. 3, data word (1.5M−3) is split, its high byte loaded into chip C1 while its low byte is loaded into chip C2. Data words (1.5M−2) and (1.5M−1) are similarly split and each byte loaded into chips C1 and C2 as shown.

As can be seen in FIG. 3, the high data bytes associated with consecutive memory addresses are loaded into contiguous cells within flash memory chip C0 in the first mode of operation. In contrast, the low data bytes associated with consecutive memory addresses are distributed among chips C1 and C2 in a repeating selection sequence in this first mode of operation. The selection sequence for the low data bytes of consecutive memory addresses is a simple alternating pattern between chips C1 and C2. For an alternate embodiment of the present invention, the repeating selection sequence used to load a particular portion of data associated with consecutive memory address may be any type of sequence which provides an approximately even distribution of data among chips C1 and C2. Also, as shown in FIG. 3, data associated with consecutive memory addresses above the critical address is loaded into contiguous cells in chips C1 and C2.

For an alternate embodiment of the present invention, the above described first and second modes of operation may be reversed or intertwined with each other. For an embodiment of the present invention in which, for example, five 8 bit memory devices are used to store word data, three of the memory devices may be loaded in the manner described above, while the remaining two memory devices are filled in a more conventional manner. For another embodiment, one of the five memory devices may be filled with equivalent data byte portions (high or low) from data words while the other data byte portion of the data words are distributed among the remaining four memory devices. For this embodiment, the first mode of operation causes the first memory device to fill to capacity while the remaining four memory devices are filled to only one quarter of their capacity, assuming all devices have an equal memory capacity.

For alternate embodiments of the present invention, the memory subsystem loading scheme described above and shown in FIG. 3 can be applied to virtually any system in which the total data bit width of the memory subsystem does not match the bit width of the processor data bus. For example, for an embodiment in which the processor data bus is 32 bits wide, five, six or seven 8 bit wide memory devices may be filled by loading 8 bit portions of the 32 bit wide data associated with consecutive memory addresses into contiguous address locations of 1, 2 or 3 memory devices respectively, while the remaining data for each memory address is distributed among the remaining chips. For another embodiment, the memory devices comprising the memory subsystem may each have data bit widths of 16 bits or wider.

Note that in many computer systems, memory addresses are defined for byte size data. In such addressing schemes, consecutive addresses associated with 16 bit data words, 32 bit double words, 64 bit quad words and other data packet sizes may not necessarily be in strictly numerical order. For example, consecutive memory addresses associated with data words increment by two for each consecutive address.

FIG. 4 shows the internal operation of interface 201 of FIG. 2. For this embodiment, processor address bus 205 comprises the 21 address lines, PROC_A [21:1]. Processor data bus 206 comprises the 16 data lines, PROC_D [15:0]. Address lines of processor address bus 205 are routed to the input of address multiplexer 400, data multiplexer 401 and chip select decoder 402. Data lines of processor data bus 206 are routed to the input of data multiplexer 401. The memory subsystem address bus includes the output from address multiplexer 400 comprising address lines 207 coupled to address input A[19:0] of chip C0, address lines 210 coupled to address input A[19:0] of chip C1 and address lines 213 coupled to address input A[19:0] of chip C2. For an alternate embodiment of the present invention, only a single set of address lines are output from address multiplexer 400, and these address lines are split and appropriately routed to each of the three chips, C0, C1, and C2 outside of interface 201. For this embodiment, the pin count of interface 201 is substantially reduced, thereby reducing the size and cost of the interface.

The memory subsystem data bus includes the output from data multiplexer 401 comprising data lines 208 coupled to data input D[7:0] of chip C0, data lines 211 coupled to data input D[7:0] of chip C1 and data lines 214 coupled to data input D[7:0] of chip C2. Finally, the output of chip select (CS) decoder 402 comprises CS line 209 coupled to the CS input of chip C0, CS line 212 coupled to the CS input of chip C1 and CS line 215 coupled to the CS input of chip C2. The mapping scheme for address multiplexer (MUX) 400 is shown in Table 403. The mapping scheme for data MUX 401 is shown in Table 404. The truth table for CS decoder 402 is shown in Table 405. As noted above, a typical computer system would contain additional routing and logic circuitry including, for example, control lines and associated logic for controlling the flow of addresses and data among the various components. These additional features have not been shown in FIG. 4 to avoid obscuring the present invention As discussed above in conjunction with FIG. 3, a first mode of operation for interface 201 is in effect for data associated with addresses equal to or below the critical address. Because the critical address corresponds to the largest address which can be accommodated by chip C0, and because chip C0 can store up to 1 MB of data in the embodiment shown in FIGS. 3 and 4, then the critical address in this embodiment is the word address corresponding to 1 mega-word, which corresponds to 2 MB of total memory consumed. At 2 MB, the twenty first bit at address location PROC_A[21] switches from a "0" to a "1". When this occurs, interface 201 switches into the above described second mode of operation. Therefore, the address MUX 400, data MUX 401 and CS decoder 402 all monitor the bit at location A[21] to determine which mode of operation interface 201 is in.

Looking at address MUX 400 and its associated table 403 in FIG. 4, it can be seen that during the first mode of operation, when the address bit at location PROC_A[21] (or, simply, A[21]) contains a value of "0", chip C0 address lines 207 (C0A) are mapped to address lines PROC_A [20:1]. This provides essentially direct mapping of word addresses from processor address bus 205 to chip C0. This is shown in FIG. 3 in that, as shown, contiguous cells within chip C0 are loaded with data associated with consecutive memory addresses. At the same time, chip C1 address lines 210 (C1A) and chip C2 address lines 213 (C2A) are mapped to processor address lines PROC_A[21:2]. This mapping scheme causes address locations within chips C1 and C2 to increment with every other data word associated with consecutive memory word addresses from processor 200. This is shown in FIG. 3 in that contiguous address locations of chips C1 and C2 are loaded with portions of every other data word associated with consecutive memory addresses. When critical address bit A[21] contains a value of "1", an address beyond the capacity of chip C0 is being identified, and interface 201 maps address and data information under a second mode of operation. Under this condition, C1A and C2A accept address lines PROC_A[20:1] from processor address bus 205, which indicates that data associated with consecutive memory word addresses above the critical address is to be loaded in contiguous address locations in chips C1 and C2.

Turning now to data MUX 401 and its associated mapping table 404 of FIG. 4, it can be seen that for addresses equal to and below the critical address (A[21]="0") the high order data byte from processor data bus 206, PROC_D[15:8], is mapped to chip C0 data lines 208 (C0D). Also, during this first mode of operation it can be seen from Table 404 that the low order data byte from processor data bus 206 PROC_D[7:0], is alternatively mapped to either chip C1 data lines 211 (C1 D) or chip C2 data lines 214 (C2D) depending on the value of the address bit at address location PROC_A[1] (or, simply, A[1]). This alternating mapping scheme works to distribute equivalent data portions among chips C1 and C2 as shown in FIG. 3, described above. Once the critical address bit A[21] switches to a value of "1", interface 201 enters the second mode of operation, and, as shown in Table 404, the high order data byte from processor data bus 206, PROC_D[15:8], is mapped to C1D while the low data byte, PROC_D[7:0], is mapped to C2D. As shown in FIG. 3, this second mode mapping by data MUX 401 results in the loading scheme shown in memory blocks 301 and 302 above the 500 KB limit wherein data associated with consecutive memory addresses is loaded into contiguous memory cells in chips C1 and C2.

Finally, turning to CS decoder 402 and its associated truth table 405, it can be seen that the chip select lines track the data MUX mappings. For addresses equal to and below the critical address (A[21]="0") chip C0 chip select line 209 (C0CS) is selected (contains a value of "1"). Also, during this first mode of operation it can be seen from Table 405 that either chip C1 chip select line 212 (C1CS) or chip C2 chip select line 215 (C2CS) is selected depending on the value of the address bit at address location A[1]. This alternating mapping scheme works to distribute equivalent data portions among chips C1 and C2 as shown in FIG. 3, described above. Once the critical address bit A[21] switches to a value of "1", interface 201 enters the second mode of operation, and, as shown in Table 405, C1CS and C2CS are both selected while C0CS is de-selected. As shown in FIG. 3, chip selection by decoder 402 in this second mode of operation results in the loading scheme shown in memory blocks 301 and 302 above the 500 KB limit wherein data associated with consecutive memory addresses is loaded into contiguous memory cells in chips C1 and C2.

A mapping scheme similar to that shown in FIG. 4 can be used to implement a wide variety of loading schemes, some of which have been described above. In addition, a mapping scheme similar to that shown in FIG. 4 can be used to read data back from a memory subsystem when the processor attempts to retrieve data previously loaded in a manner in accordance with one embodiment of the present invention. Also, one skilled in the art understands that the binary values "0" and "1" may easily be reversed depending on the logical definitions of particular components (e.g. active high versus active low, positive logic versus negative logic, etc.).

FIG. 5 is a flow chart showing a method in accordance with one embodiment of the present invention. At step 500, the sequence is initiated. At step 501 the processor places data on the processor data bus, each packet of data being associated with consecutive addresses. Note that this data associated with consecutive addresses need not be placed consecutively on the data bus. For example, the processor might place data DX associated with address AX on the data bus, then place data DY associated with address AY on the data bus, then place data DZ associated with address AZ on the data bus. In this example, if addresses AX and AZ are consecutive, data words DX and DZ are said to be associated with the consecutive addresses.

In accordance with one embodiment of the present invention, at step 502, the interface coupling the processor to a memory subsystem determines if the addresses to which the data is associated is greater than the critical address. If it is not greater than the critical address, then, at step 505, some portion of the data associated with each address is loaded into contiguous cells of a first memory device. For example, if the data associated with each address is 32 bits in length, 16 bit portions may be loaded into contiguous cells of the first memory device. Next, at step 506, another portion of the same data from step 505 is distributed in some manner among second and third memory devices.

At step 507, the processor determines if there is more data to be loaded into memory. If so, steps 501 and 502 are repeated as described above. If the address is greater than the critical address, however, steps 503 and 504 are executed. At step 503, some portion of the data associated with each address is loaded into contiguous cells of the second memory device so that data associated with consecutive addresses is stored in contiguous address locations of the memory device. Similarly, in step 504, another portion of the same data associated with each address is loaded into contiguous cells of the third memory device. Again, step 507 is reached in which the processor determines if there is more data to be loaded in the memory subsystem. If not, the sequence stops.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An interface for coupling a processor to a memory subsystem, the interface comprising:
   data lines to couple first and second portions of a processor data bus to a memory subsystem data bus, the memory subsystem comprising a plurality of memory devices;
   address lines to couple a processor address bus to a memory subsystem address bus; and
   interface circuitry to map data associated with consecutive memory addresses from the first portion of the processor data bus to the plurality of memory devices such that data from the first portion of the processor data bus is alternately distributed among two or more of the plurality of memory devices in a sequence based on the associated memory addresses, the interface circuitry further mapping data from the second portion of the processor data bus to at least one of the plurality of memory devices.

2. The interface of claim 1, wherein the interface circuitry comprises a chip select decoder for selecting at least two of the plurality of memory devices for each of the memory addresses.

3. The interface of claim 1, wherein the interface circuitry comprises a data multiplexer for distributing the data from the first portion of the processor data bus among the plurality of memory devices.

4. The interface of claim 3, wherein the interface circuitry concurrently maps data associated with the consecutive memory addresses from the second portion of the processor data bus to contiguous address locations in the at least one of the plurality of memory devices of the memory subsystem.

5. The interface of claim 1, wherein the interface circuitry comprises an address multiplexer for coupling the processor address bus to the memory subsystem address bus.

6. The interface of claim 1, wherein each of the plurality of memory devices of the memory subsystem has approximately the same storage capacity and the memory subsystem has a total data bit width equal to a sum of data bit widths of each of the plurality of memory devices, the total data bit width of the memory subsystem divided by a bit width of the processor data bus being a non-integer.

7. The interface of claim 1, wherein each of the plurality of memory devices comprises a flash memory chip.

8. The interface of claim 6, wherein the memory subsystem comprises a first 8 bit wide memory device, a second 8 bit wide memory device, and a third 8 bit wide memory device, the total data bit width of the memory subsystem being equal to 24 bits, and the bit width of the processor data bus being equal to 16 bits.

9. The interface of claim 8, wherein the first portion of the processor data bus is 8 bits wide, and the sequence comprises a first step of mapping data associated with a first memory address from the first portion of the processor data bus to the first 8 bit wide memory device, a second step of mapping data associated with a second, consecutive memory address from the first portion of the processor data bus to the second 8 bit wide memory device, and repeating the sequence for data associated with a subsequent plurality of consecutive memory addresses.

10. The interface of claim 9, wherein the interface concurrently maps data associated with the consecutive memory addresses from the second portion of the processor data bus to contiguous address locations in the third 8 bit wide memory device, the second portion of the processor data bus being 8 bits wide.

11. The interface of claim 1, wherein the interface circuitry concurrently maps data associated with the consecutive memory addresses from the second portion of the processor data bus to contiguous address locations in the at least one of the plurality of memory devices of the memory subsystem.

12. The interface of claim 1, wherein each of the plurality of memory devices comprises a flash memory chip.

13. A computer system, comprising:
- a processor including a processor data bus and a processor address bus;
- a memory subsystem including a memory subsystem data bus and a memory subsystem address bus, the memory subsystem comprising memory devices and having a total data bit width equal to a sum of data bit widths of each of the memory devices, the total data bit width of the memory subsystem divided by a bit width of the processor data bus being a non-integer; and
- an interface for coupling the processor data bus and the processor address bus to the memory subsystem data bus and the memory subsystem address bus, respectively, the interface comprising interface circuitry for, while in a first mode, mapping data associated with consecutive memory addresses from a first portion of the processor data bus to a repeating selection sequence of the memory devices such that data from the first portion of the processor data bus is distributed among a first plurality of memory devices with each sequence, the interface circuitry concurrently mapping data associated with consecutive memory addresses from a second portion of the processor data bus to contiguous address locations in at least one of the memory devices of the memory subsystem.

14. The computer system of claim 13, wherein the interface circuitry provides for operation in a second mode, the second mode comprising mapping data associated with consecutive memory addresses from a first portion of the processor data bus to contiguous address locations in a first one of the memory devices of the first plurality of memory devices, and mapping data associated with consecutive memory addresses from a second portion of the processor data bus to contiguous address locations in a second one of the memory devices of the first plurality of memory devices.

15. The computer system of claim 14, wherein each of the memory devices comprises a flash memory chip.

16. The computer system of claim 13, wherein the interface circuitry comprises a chip select decoder for selecting at least two of the memory devices for each of the memory addresses.

17. The computer system of claim 13, wherein each of the memory devices comprises a flash memory chip.

18. The computer system of claim 13, wherein the interface circuitry comprises a data multiplexer for distributing the data from the first portion of the processor data bus among the first plurality of memory devices.

19. The computer system of claim 13, wherein the interface circuitry comprises an address multiplexer for coupling the processor address bus to the memory subsystem address bus.

20. A method of loading data into a plurality of memory devices, the method comprising the steps of:
- loading a first portion of data associated with a first address into a first cell in a first one of the plurality of memory devices;
- loading a second portion of the data associated with the first address into a second cell in a second one of the plurality of memory devices;
- loading a third portion, equivalent to the first portion, of data associated with a second address into a third cell in the first one of the plurality of memory devices; and
- loading a fourth portion, equivalent to the second portion, of the data associated with the second address into a fourth cell in a third one of the plurality of memory devices.

21. The method of claim 20, wherein the steps are repeated a plurality of times for a plurality of other addresses.

22. The method of claim 21, further comprising the step of loading data associated with consecutive addresses above a critical address into contiguous cells of the second one and the third one of the plurality of memory devices, the critical address being an address corresponding to the largest address which can be accommodated by the first one of the plurality of memory devices.

23. The method of claim 20, wherein the first address and the second address are consecutive.

24. The method of claim 20, wherein each of the memory devices comprises a flash memory chip.

25. The method of claim 20, wherein a sum of data bit widths of each of the plurality of memory devices divided by a bit width of the data bus is a non-integer.

26. The method of claim 20, wherein each of the plurality of memory devices has approximately the same storage capacity.

27. The method of claim 20, further comprising the step of loading data associated with consecutive addresses above a critical address into contiguous cells of the second one and the third one of the plurality of memory devices, the critical address being an address corresponding to a largest address which can be accommodated by the first one of the plurality of memory devices.

28. The method of claim 20, wherein the first cell and the third cell are contiguous.

29. A method of loading data from a data bus into a plurality of memory devices, the method comprising the steps of:
- loading data associated with a first address from a first portion of the data bus to a first cell in a first one of the plurality of memory devices;
- loading data associated with the first address from a second portion of the data bus to a second cell in a second one of the plurality of memory devices;
- loading data associated with a second address from the first portion of the data bus to a third cell in the first one of the plurality of memory devices, the second address and the first address being consecutive and the third cell being contiguous with the first cell; and
- loading data associated with the second address from the second portion of the data bus to a fourth cell in a third one of the plurality of memory devices,
- repeating the steps a plurality of times for a plurality of other addresses.

30. The method of claim 29, further comprising the step of loading data associated with consecutive addresses above a critical address into contiguous cells of the second one and the third one of the plurality of memory devices, the critical address being an address corresponding to the largest address which can be accommodated by the first one of the plurality of memory devices.

31. The method of claim 30, wherein each of the plurality of memory devices has approximately the same storage capacity and a sum of data bit widths of each of the plurality of memory devices divided by a bit width of the data bus is a non-integer.

32. The method of claim 31, wherein each of the plurality of memory devices comprises a flash memory chip.

33. The method of claim 29, wherein each of the plurality of memory devices comprises a flash memory chip.

* * * * *